(12) United States Patent
Weare

(10) Patent No.: US 7,266,548 B2
(45) Date of Patent: Sep. 4, 2007

(54) AUTOMATED TAXONOMY GENERATION

(75) Inventor: Christopher B Weare, Bellevue, WA (US)

(73) Assignee: Microsoft Corporation, Remond, WA (US)

( * ) Notice: Subject to any disclaimer, the term of this patent is extended or adjusted under 35 U.S.C. 154(b) by 448 days.

(21) Appl. No.: 10/881,893

(22) Filed: Jun. 30, 2004

(65) Prior Publication Data
US 2006/0004747 A1  Jan. 5, 2006

(51) Int. Cl.
G06F 7/00 (2006.01)
G06F 17/30 (2006.01)
G06F 17/00 (2006.01)

(52) U.S. Cl. .............................. 707/3; 707/5; 707/101; 707/102

(58) Field of Classification Search ................... 707/3, 707/5, 101, 102
See application file for complete search history.

(56) References Cited

U.S. PATENT DOCUMENTS

| 5,325,298 | A | * | 6/1994 | Gallant | .......................... | 704/9 |
|---|---|---|---|---|---|---|
| 5,619,709 | A | * | 4/1997 | Caid et al. | .................. | 715/532 |
| 6,298,340 | B1 | | 10/2001 | Calvignac et al. | | |
| 6,360,227 | B1 | * | 3/2002 | Aggarwal et al. | .......... | 707/102 |
| 6,438,590 | B1 | | 8/2002 | Gartner et al. | | |
| 6,446,061 | B1 | * | 9/2002 | Doerre et al. | .................. | 707/3 |
| 6,484,149 | B1 | | 11/2002 | Jammes et al. | | |
| 6,526,440 | B1 | | 2/2003 | Bharat | | |
| 6,529,903 | B2 | | 3/2003 | Smith et al. | | |
| 6,615,209 | B1 | | 9/2003 | Gomes et al. | | |
| 6,647,004 | B2 | | 11/2003 | Allen, Jr. et al. | | |
| 6,658,423 | B1 | | 12/2003 | Pugh et al. | | |
| 6,675,163 | B1 | | 1/2004 | Bass et al. | | |
| 6,678,681 | B1 | | 1/2004 | Brin | | |
| 6,704,729 | B1 | | 3/2004 | Klein et al. | | |
| 7,103,609 | B2 | * | 9/2006 | Elder et al. | .................. | 707/102 |
| 2002/0078091 | A1 | * | 6/2002 | Vu et al. | ..................... | 707/513 |
| 2002/0123988 | A1 | | 9/2002 | Dean et al. | | |
| 2002/0133481 | A1 | | 9/2002 | Smith et al. | | |
| 2002/0147906 | A1 | | 10/2002 | Lotspeich et al. | | |

(Continued)

OTHER PUBLICATIONS

Beitzel et al., Using Titles and Category Names for Editor-Driven Taxonomies for Automatic Evaluation, CIKM 2003, Nov. 3, 2003, New Orleans, LA, USA, pp. 17-23.

(Continued)

*Primary Examiner*—Sam Rimell
*Assistant Examiner*—Jared M Bibbee

(57) ABSTRACT

In a hierarchical taxonomy of document, the categories of information may be structured as a binary tree with the nodes of the binary tree containing information relevant to the search. The binary tree may be 'trained' or formed by examining a training set of documents and separating those documents into two child nodes. Each of those sets of documents may then be further split into two nodes to create the binary tree data structure. The nodes may be generated to maximize the likelihood that all of the training documents are in either or both of the two child nodes. In one example, each node of the binary tree may be associated with a list of terms and each term in each list of terms is associated with a probability of that term appearing in a document given that node. New documents may be categorized by the nodes of the tree. For example, the new documents may be assigned to a particular node based upon the statistical similarity between that document and the associated node.

30 Claims, 6 Drawing Sheets

U.S. PATENT DOCUMENTS

2003/0217335 A1* 11/2003 Chung et al. ............... 715/514
2004/0111438 A1* 6/2004 Chitrapura et al. ......... 707/200
2005/0114161 A1* 5/2005 Garg et al. .................... 705/1

OTHER PUBLICATIONS

Brin et al, The Anatomy of a Large-Scale Hypertextual Web Search Engine, http://www7.scu.au/programme/fullpapers/1921/com1921.htm.

Hofmann, Probablistic Latent Semantic Indexing, 22nd Int'l SIGIR Conference on R&D in Information Retrieval, Aug. 15, 1999, pp. 50-57.

McCallum et al., A comparison of Event Modelsfor Naive Bayes Text Classification, http://www-2.cs.cmu.edu/~knigam/papers/multionomial-aaaiws98.pdf.

Sebastiani, Machine Learning in Automated Text Categorization, ACM Computing Surveys, vol. 34, No. 1, Mar. 2002, pp. 1-47.

Waldvogel et al., Scalable High Speed Prefix Matching, ACM Transactions on Computer Systems, vol. 19, No. 4, Nov. 2001, pp. 440-482.

Zhai et al, A Study of Smoothing Methods for Language Models Applied to Information Retrieval, ACM Transaction on Information systems, vol. 22, No. 2, Apr. 2004, pp. 179-214.

* cited by examiner

AUTOMATED TAXONOMY GENERATION

FIELD OF THE INVENTION

This application is directed to taxonomy generation, and more particularly, to automated taxonomy generation of documents.

BACKGROUND OF THE INVENTION

To find a particular document of interest, a computer user may conduct an electronic search through a query engine to search a collection of documents. However, some collections of documents, such as web pages on the Internet and document databases, may return numerous documents to a user generally based on the query terms suggested by the user. To address the dispersion of retrieved document, the results, or links to documents, may be further sorted or filtered by date, popularity, similarity to the search terms, and/or categorized according to a manually derived hierarchical taxonomy. Additionally or alternatively, the user may select a particular category to restrict the search to those documents in that category.

Generally, a hierarchical taxonomy (or text categorization) is generated by manually defining a set of rules which encode expert knowledge on how to classify documents in a predetermined set of categories. Machine augmented taxonomy generation has generally depended on manually maintaining a controlled dictionary and sorting the documents based on assigned key words or metadata associated with a document and found in the controlled dictionary.

SUMMARY OF THE INVENTION

The following presents a simplified summary of the disclosure in order to provide a basic understanding to the reader. This summary is not an exhaustive or limiting overview of the disclosure. The summary is not provided to identify key and, or critical elements of the invention, delineate the scope of the invention, or limit the scope of the invention in any way. Its sole purpose is to present some of the concepts disclosed in a simplified form, as an introduction to the more detailed description that is presented later.

The cost of creating and maintaining a manual or machine augmented taxonomy is expensive due to person-hour requirements in generating and maintaining the categories and controlled dictionary. Moreover, the nature of the content or the content itself to be sorted may change so frequently that manually adapting a taxonomy, even if augmented with a controlled dictionary, is not practical.

To automatically generate a hierarchical taxonomy or structure for text categorization, documents may be classified without any exogenous knowledge, i.e., the documents may be classified based only on knowledge extracted from the documents themselves. In the hierarchical taxonomy discussed below, the related categories of information may be structured as a binary tree with the nodes of the binary tree containing information relevant to the search. The binary tree may be 'trained' or formed by examining a training set of documents and separating those documents into two child nodes. Each of those sets of documents may then be further split into two nodes to create the binary tree data structure. The nodes may be generated to maximize the likelihood that all of the training documents are in either or both of the two nodes. In one example, each node of the binary tree may be associated with a list of terms and each term in each list of terms is associated with a probability of that term appearing in a document given that node. As new documents come in, those documents may be assigned to a particular node based upon the statistical similarity between that document and the associated node.

The documents associated with particular nodes may be retrieved based upon the node assignment, e.g., documents in a node may be retrieved by locating a node matching specified query terms. In some cases, a typical inverted index may be used by a search engine to return selected documents in response to a query by a user. To address the problem of dispersion of documents in search results, the query engine may sort, cluster, and/or filter the selected documents based upon the associated nodes. To expand the search, additional documents from related nodes may be returned.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
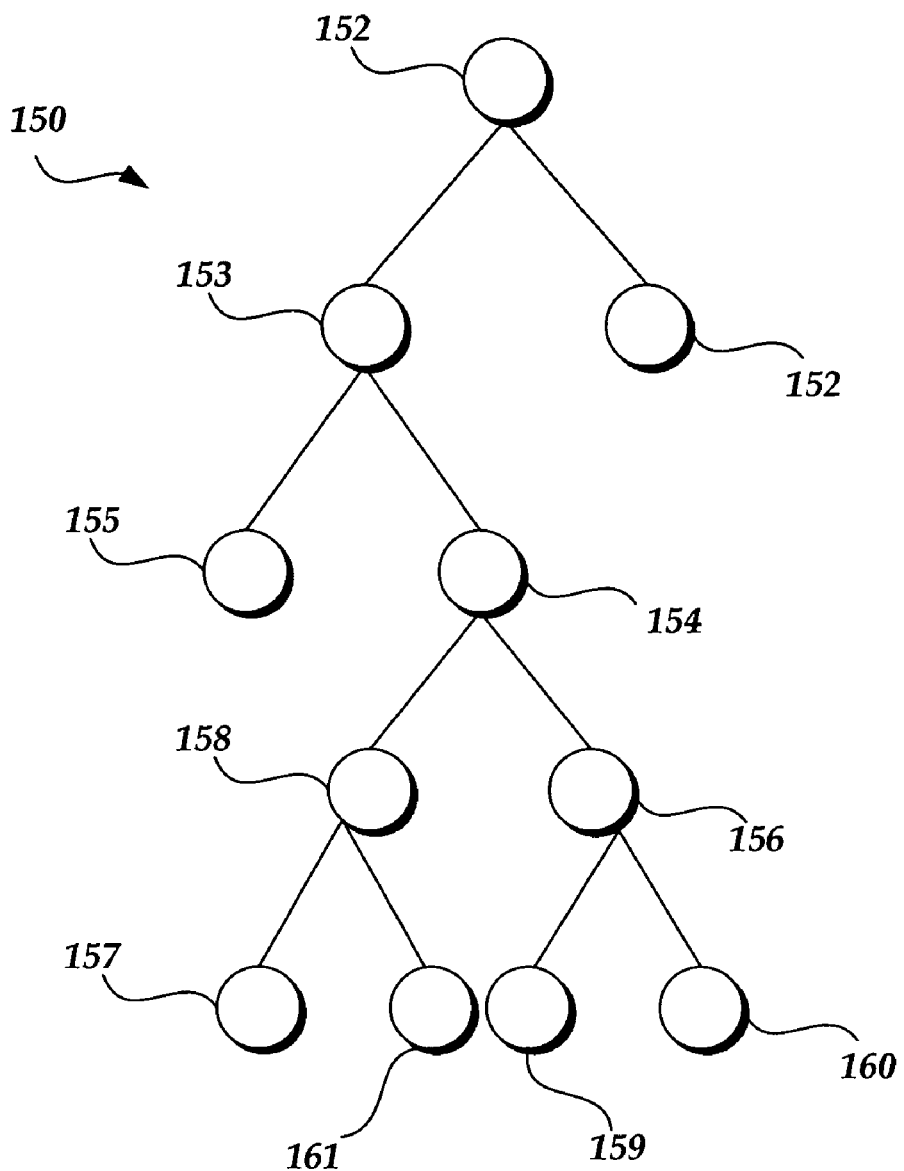
FIG. 1 is an example hierarchical binary tree in one embodiment.

A branch/node taxonomy depicted as a binary tree is one type of hierarchical taxonomy. FIG. 1 illustrates a binary tree 150. A subject node 154 represents the node of interest. In the context of an Internet search engine, subject node 154 may represent one category that is sufficiently similar to a user's query or may be the location of a document matching the query terms. A parent node 153 is a node that is one level higher (or one category broader) than the subject node 154, and a grandparent node 151 is two levels higher (or two categories broader than) than subject node 154. Child nodes 156, 158 are nodes that are one level lower than the subject node 154, and the grandchild nodes 157, 159, 160, 161 are two levels lower than the subject node 154. A sibling node 155 is a node that is on an equal level with the subject node 154 and associated with the same parent node. Further levels of "great" nodes (not shown) may be present in either direction (e.g., great grandparent and great-great grandchild). As shown in FIG. 1, the grandparent node 151 is the root node, i.e., the highest level node in the binary tree 150. The binary tree may be balanced or unbalanced, however, the nature of a binary tree requires that each node either have exactly two children or no children.

The documents in the training set may be selected using any suitable source. For example, a batch of documents may be desired to be categorized. To train the tree, at least a portion of the documents to be categorized may be selected as the training set of documents. Additional or alternative training documents may be selected from benchmark collections including the Reuters® collection for news documents, the OHSUMED™ collection for medical documents, the 20 Newsgroups™ collection for posted newsgroup messages, and the AP™ collection for news documents.

Figure 2:
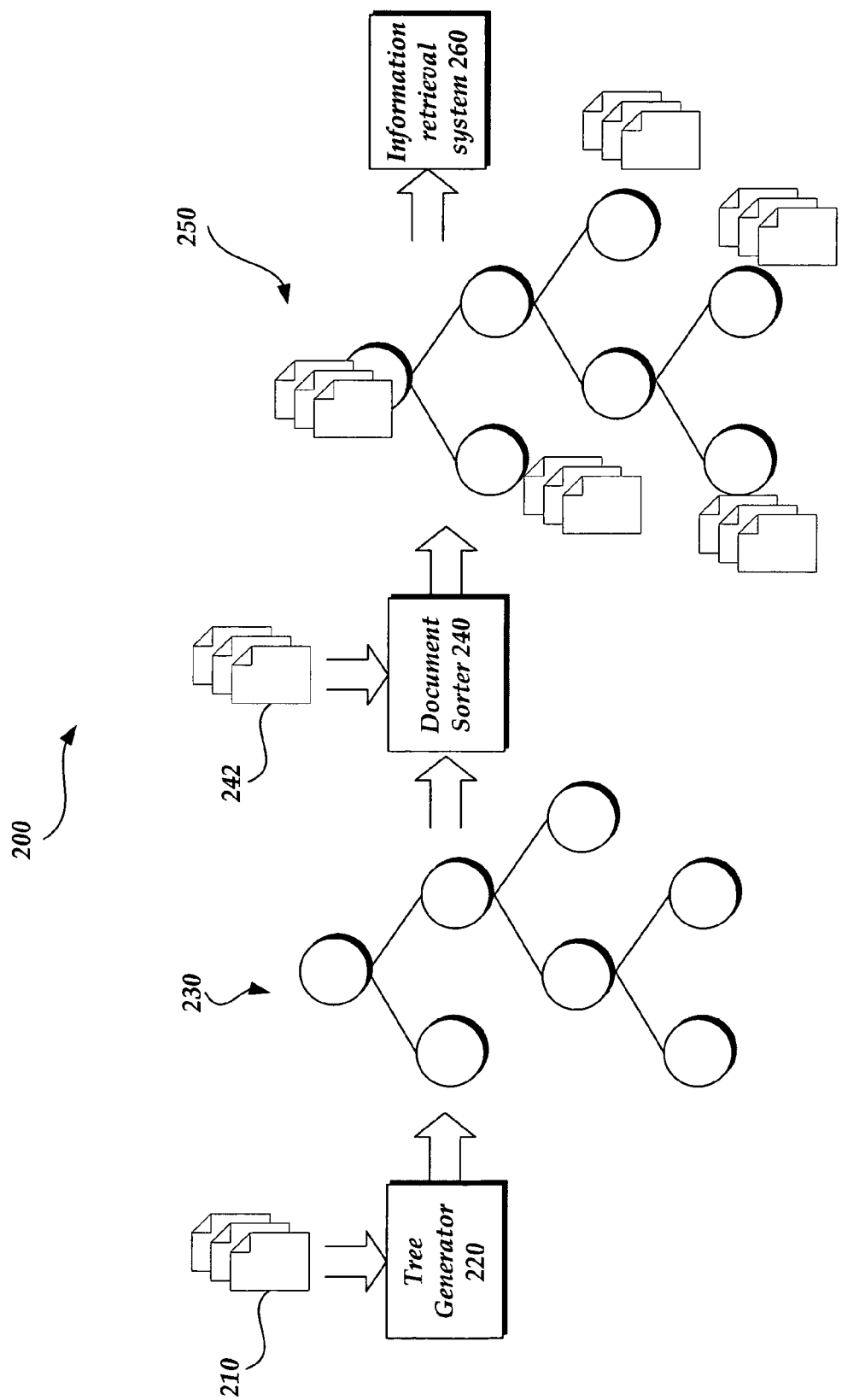
FIG. 2 is an example schematic diagram of a binary tree taxonomy process suitable for forming and using the binary tree of FIG. 1 in one embodiment.

As shown in FIG. 2, a training set of documents 210 may be input into a tree generator 220 which generates a binary hierarchical taxonomy tree based on exogenous information from the training set of documents, e.g., the terms in each document. Thus, the training documents may be examined to determine a set of training terms based upon the terms within all of the training documents.

Figure 3:
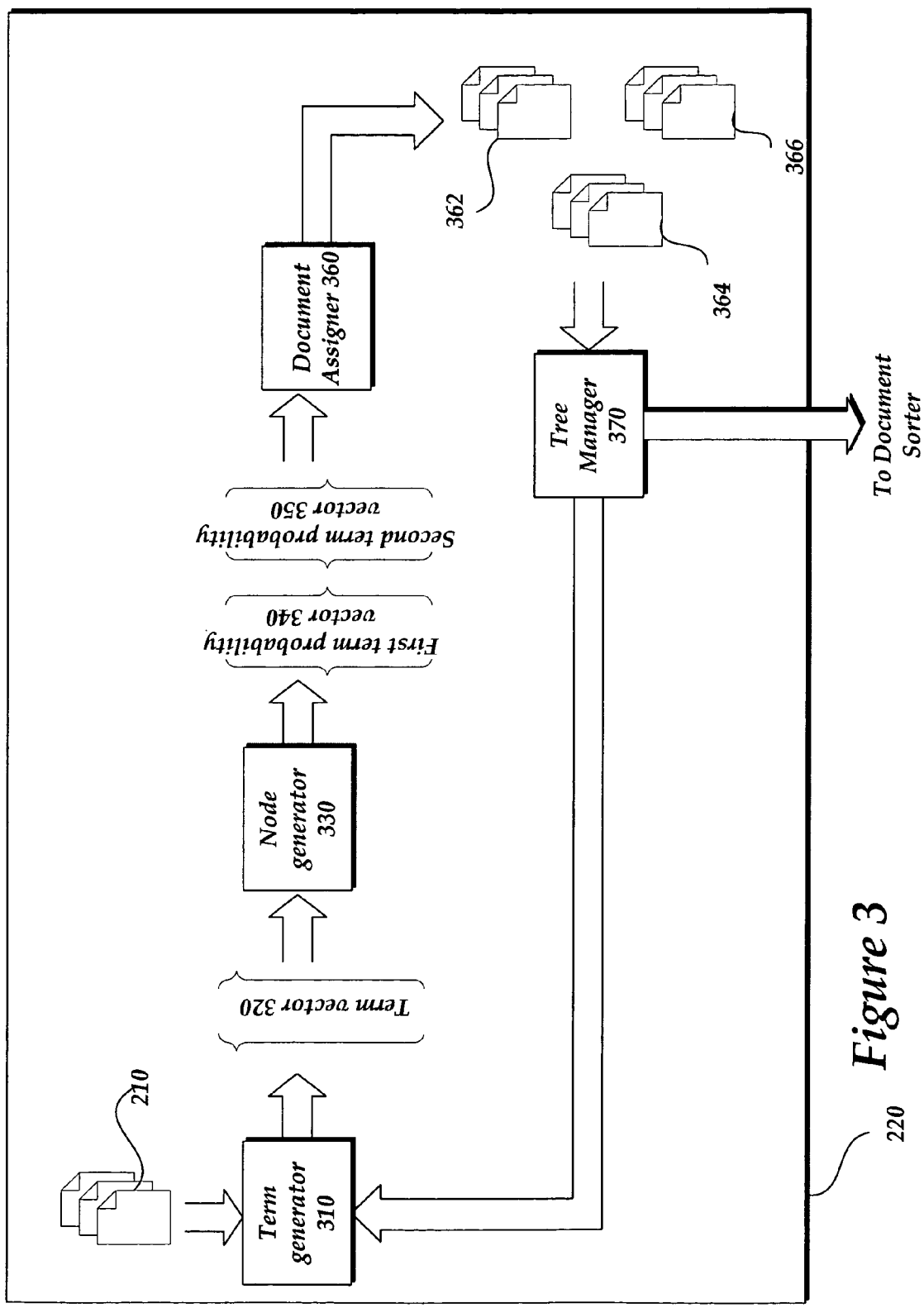
FIG. 3 is a schematic diagram of an example tree generation of the taxonomy process of FIG. 2 in one embodiment.

The terms used to train the tree may be selected using any suitable method from within the selected training documents. FIG. 3 illustrates one example of a tree generator 220 of FIG. 2. The tree generator 220 may include a term generator 310 to determine a vector or list of training terms 320 to be used to train the tree. For example, under the Naïve Bayes assumption, each training document may be treated as a list or vector of terms since under the Naïve Bayes assumption, each document is treated as a collection of statistically unrelated terms.

The terms used to train the tree may be selected from all terms appearing in all of the documents based upon the accumulated number of occurrences for each term. The terms to train the tree may appear in a large number of documents and/or may appear often in a particular document. Moreover, the term generator may access a predetermined list of exclusion terms to ensure that the selected terms to train the tree are not known to be less effective at training a document. For example, terms like prepositions, articles, and/or pronouns, although appearing often in most documents, may not be optimal as terms to train the taxonomy tree. Moreover, the list exclusion terms may be accessed from available stop lists. The exclusion terms may be generated using any suitable method including heuristics, past performance of training terms, and if the occurrence f the term is substantially the same in each document within the training set of documents.

In some cases, it may be beneficial for the sake of computational efficiency to limit the number of terms used in training the system. Typically, the top N terms, where N ranges from 10,000 to 100,000 depending on the nature of the corpus of training documents, according to some utility measure are selected as the training terms. The two simplest measures are the number of times a word is used in the corpus (term count) and the number of documents that contain the word (document count). Another useful measure combines both of these measures. For example, the utility measure of a given term may be taken to be the square of the term count divided by the document count.

As shown in FIG. 3, the term generator 310 may receive the training set of documents 210 and count the number of occurrences of each term in each document, and accumulate those counts for all the documents in the training set that contain the term. If the number of occurrences of the term (term count) squared divided by the number of documents that contain the term (document count) is large, then the term is used frequently in the training documents; and conversely, if the number of occurrences of the term squared divided by the number of documents is small, then the term is used only occasionally or if used often it only appears a few times in each document. Other methods of selecting the training terms may be suitable including different ways of calculating relative frequency, and/or multiple words may be tokenized to form phrases which are counted as a single term. The selected terms may be stored in a data store as a vector of terms 320, as shown in FIG. 3. The vector of terms 320 may be associated in the data store with the present node of the binary tree, which on the first iteration is the root node.

As shown in FIG. 3, the term generator 310 passes the term vector 320 to the node generator 330. The node generator 330 may generate two child nodes of the present node with each child node associated with the term list or vector 320 of the selected training terms. To form the two child nodes, each term in the term vector 320 may be associated with a probability of that term appearing in a document, in other words, the probability of that word being picked to appear in a document. The probabilities associated with the first child node may be stored in a data store as a set of term probabilities in a vector 340, and the probabilities associated with the second child node may be stored in a data store as a set of term probabilities in a vector 350 as shown in FIG. 3. Since each child node is associated with a vector of term probabilities, two vectors of term probabilities 340, 350 are generated to correspond to the two child nodes being generated.

To develop each vector of term probabilities 340, 350, each probability of a term appearing in a document may be initialized. For example, the probabilities may be initialized through any suitable method such as randomly generating the probabilities with a random number generator or adjusting or modifying the number of occurrences of the term in the training set of documents. In some cases, it may be suitable to initialize the probability of a term appearing in a document to different values in each term probability vector. More particularly, it may be suitable to ensure that the two term probability vectors 340, 350 are not identical.

The node generator 330 may then optimize the term probabilities in the term probability vectors 340, 350 associated respectively with the two child nodes. For example, the term probabilities may be optimized using any suitable method such as Expectation Maximization, genetic algorithms, neural networks, simulated annealing, and the like. For example, the node generator 330 may optimize the term probabilities to maximize the likelihood that each of the training documents may be formed from the list of terms associated with both of the sibling nodes. More particularly, the term probabilities in each vector may be optimized over the entire corpus of training documents by computing the probability that each training document is created by the terms associated with the first child node (term vector 320) based on the initialized probability of each term appearing in a document (term probability vector 340), and computing the probability that the same training document is created by the terms associated with the second child node (term vector 320) based on the initialized probability of each term appearing in a document (term probability vector 350), Using Expectation Maximization, the node generator 320, shown in FIG. 3, may maximize the log likelihood that all training documents are generated by the terms in each of the two sibling nodes. The log likelihood that all the training documents will be generated by the terms available in each of the two nodes may be given by the equation:

$$L = \text{Sum}\{\text{Sum}[n(d_i, w_{jk}) \log(P(d_i, w_{jk})), j], i, k\}$$

In the above equation, $n(d_i, w_{jk})$ is the number of occurrences of term $w_j$ in document $d_i$ in node k, and $P(d_i, w_{jk})$ is the probability of the term $w_j$ of node k occurring in document $d_i$ which is based upon the probability of the term occurring in any document. The term probabilities associated with each node may then be iteratively adjusted to maximize the log likelihood. The maximization may be an absolute maximum or a relative maximum. These resulting term probabilities are stored in the vectors 340, 350 of FIG. 3 and associated with their respective child nodes in a data store. In this manner, the each of the two child nodes (or parent nodes 152, 153 of FIG. 1) are associated with a list of training terms (term vector 320) and a respective probability of each term appearing in a document (term probability vector 340, 350) which has been optimized to maximize the log likelihood of the set of training documents being formed from the terms in each child node.

In one example, an aspect formalization of the problem may be used to solve for the word and document probabilities using Expectation Maximization. Although various version of Expectation Maximization may be appropriate, one representative example is described in Hofmann, "Probabilistic Latent Semantic Indexing," Proceedings of the 22$^{nd}$ Int'l SIGR Conference on Research and Development in Information Retrieval, pp. 50-57, Aug. 15-19, 1999, Berkeley, Calif., incorporated by reference herein. In some cases it may be suitable to follow the Expectation Maximization approach as discussed by Hofmann, however, rather than retaining the document probabilities in the Expectation Maximization process, a distance measure such as the Kl divergence between document and word probabilities may be used to reduce adjusting model parameters for new documents.

To form the set of test documents for the lower levels of the binary tree, the set of test documents 210 may be assigned to at least one of the two child nodes. In this manner, the documents associated with the first child node can be used to generate two grandchild nodes and the documents associated with the second child node can be used to generate two more grandchild nodes to form the binary tree 150 of FIG. 1.

As shown in FIG. 3, the tree generator 220 may include a document assigner 360 which assigns the set of training documents 210 to at least one of the two child nodes or a null set. The document assigner 360 may assign a document to the null set if the document is determined to be unsuitable for training. In this manner, as shown in FIG. 3, three sets of documents may be formed: document set 362 associated with the first child node, document set 364 associated with the second child node, and document set 366 being the null set of documents to be removed from the training set.

The document assigner 360 of FIG. 3 may associate each document of the training set 210 to one or both of the two child nodes or null set using any suitable method such as an entropy or distance measure. For example, the document assigner 360 may determine a Kl divergence between each document and each of the two child nodes using the optimized term probability vectors 340, 350 associated with the respective child nodes. In one representative example, the Kl divergence may be determined using the equation:

$$S_j = \text{Sum}[P(w_j) * \log(P(w_i)/Z_j(w_i))]$$

Where $S_j$ is the Kl divergence, $P(w_i)$ is the probability the term $w_i$ is found in the given document, and $Z_j(w_i)$ is the probability that the term $w_i$ is found in the node j. It is to be appreciated that other suitable statistically motivated distance or similarity measures may be suitable including a symmetric version of the above equation.

Typically, documents only contain a subset of the terms found in the given node. Therefore, in order to constrain the Kl divergence, smoothed word probabilities may be employed. The term probabilities may be smoothed using any suitable method. A practitioner skilled in the art of textual information retrieval will be familiar with several methods for word probability smoothing including but not limited to simplified Jelinek-Mercer, Dirichlet prior, and absolute discounting. One representative example is described in Zhai, et al., "A study of smoothing methods for language information retrieval," ACM Transactions, Vol. 22, No. 2, April 2004, pp. 179-214, incorporated by reference herein. In this manner, the probability of a term appearing in a document is not zero since the whole corpus of documents provides a system knowledge which accounts for system error and the new document is treated statistically such that it is only one possible occurrence or combination of terms. A practitioner skilled in the art will appreciate that other statistical measures of distance or similarity can be used, including the Jensen-Shannon divergence, Pearson's chi squared test and so on.

In one example, each document may be assigned to the node with the lowest Kl divergence. Additionally or alternatively, each document may be assigned to a node if the Kl divergence is below a predetermined threshold. In some cases, the Kl divergence to the first node and the Kl divergence to the second node may be approximately equal or similar. In this case, the document may be associated with both nodes. In other cases, the Kl divergence to both nodes may be relatively large as compared to a predetermined threshold. In this case, the document may be assigned to the null set, e.g., that document may not be appropriate for use as a training document.

The above steps may be recursively repeated for each new level of the binary tree being generated and the process stopped when a cut condition is achieved. As shown in FIG. 3, the tree generator may include a tree manager 370 which may determine if the cut condition has been achieved. The cut condition may be any suitable parameter or metric including a minimum number of documents that can be in a node (e.g., the number of documents associated with a particular node is lower than a particular threshold value); the Kl divergence from the two new nodes to the set of training documents is similar to the Kl divergence between the set of training documents and the parent node (e.g., the difference between the Kl divergence to the parent node and the Kl divergence to the child nodes is below a predetermined threshold); the depth of the tree along a given branch has reached a predetermined limit (e.g., the number of layers in the tree exceeds a predetermined threshold); and the Kl divergence between the two nodes is below a predetermined threshold (e.g., the difference between the first node and the second node is below a predetermined threshold).

When at least some of the documents in the training set have been assigned to at least one of the two child nodes or the null set, each child node will be associated with a subset of the original training set of documents (either document set 362 or document set 364). The tree manager 370 may then forward each of these sets of documents as a new set of training documents to generate a new list of training terms. More particularly, the tree manager 370 may send the document set 362 to the term generator 310 to be used as a set of training documents to generate the training set of terms 320 associated with the two grandchild nodes of the first child node. Similarly, the tree manager may send the set of documents 364 to the term generator 310 to be used as a set of training documents to generate the training set of terms 320 associated with the two grandchild nodes of the second child node.

Each set of new training terms may be used by the node generator 330 to generate and optimize the associated term probability vectors for each grandchild node. As noted above, the term probability vectors may be initialized by randomly generating the term probabilities. Alternatively, the term probabilities from the previous level (the child node) may be adjusted to initialize the term probability vectors associated with each grandchild node. For example, the term probability vector 340 may be randomly adjusted with values that are approximately 90% to approximately 110% of the original term probability values of the previous node, and similarly, the term probability vector 350 may be randomly adjusted with values that are approximately 90% to approximately 110% of the original term probability values of the previous node.

The node generator 330 may then optimize the term probability values for each of the grandchild nodes. These optimized term probabilities may then be respectively associated with the two new grandchild nodes and used to further assign the documents to at least one of the four new grandchild nodes or the null set. More particularly, each document of the set of documents 362 may be associated with the null set or at least one of the two grandchild nodes associated with the first child node, and each document of the set of documents 364 may be associated with the null set or at least one of the two grandchild nodes associated with the second child node. The document association with a node may be stored in a data store. As a result, a binary tree data structure 230 is formed, as shown in FIGS. 2 and 3, with a plurality of nodes and each node is associated with a vector of terms (term vector 320) with associated probabilities of each term appearing in a document (term probability vector 340 or 350).

Figure 4:
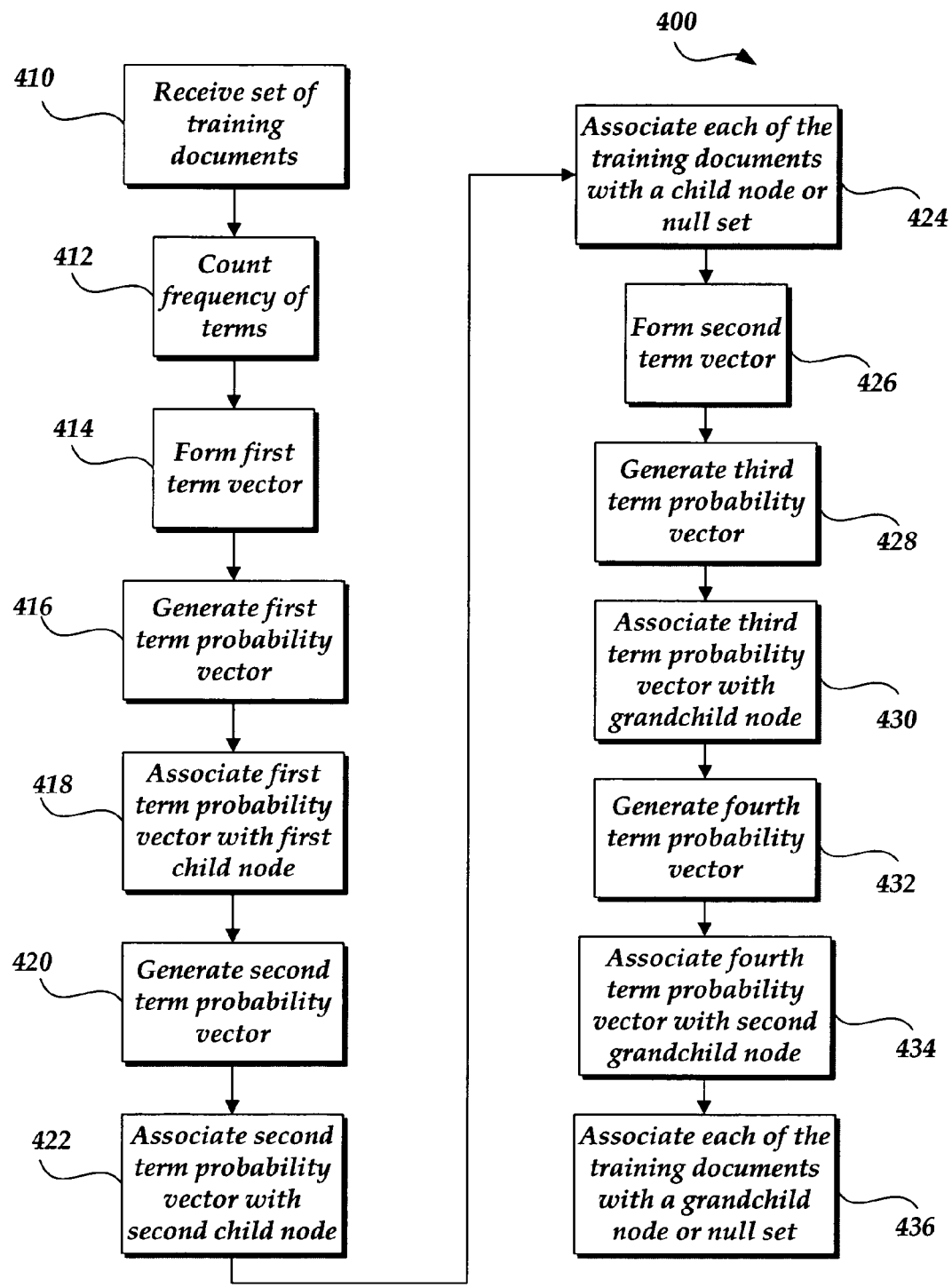
FIG. 4 is a flow chart of an example method of generating a taxonomy binary tree in one embodiment.

FIG. 4 illustrates an example method 400 of operation of the tree generator 220 of FIG. 2. The tree generator may receive 410 a set of training documents. As noted above, under the Naïve Bayes assumption, each document may be represented as a list of terms appearing in that document. The tree generator may count 412 the frequency of occurrence of each of those terms in each document. Based on the list of terms appearing in the document, the tree generator, through the term generator, may select 414 a first set of training terms which may be represented as a term vector. For each of the training terms in the training vector, the tree generator, through the node generator, may generate 416 a first probability of that training term appearing in a given document, and the first set of probabilities may be represented as a first term probability vector. The first term probability vector may be associated 418 with a first child node. The tree generator may also generate 420 for each term in the term vector a second probability of that term appearing in a given document, and the second set of probabilities may be represented as a second term probability vector. The second term probability vector may be associated 422 with a second child node. As noted above, the node generator may initialize the term probability vectors with random values and may optimize those probabilities based upon an Expectation Maximum which maximizes the log likelihood that the training documents are generated by the term probabilities associated with each of the first and second child nodes. Through the document assigner, the tree generator may associate 424 each training document (treated as a list of terms) with at least one of the first child node, the second child node, and a null set of documents unsuitable for training. The node generator, through the term generator, may form 426 a second set of training terms or term vector based upon at least a portion of the terms appearing in the set of training documents associated with the first child node. Again, through the node generator, the tree generator may generate 428 for each training term in the second term vector a third probability of the training term appearing in a document given that node and may associate 430 the resulting third term probability vector with a first grandchild node. Similarity, the tree generator may generate 432 for each training term in the second term vector a fourth probability of the training term appearing in a document given that node and may associate 434 the resulting fourth term probability vector with a second grandchild node. Based on the third and fourth term probability vectors, the tree generator, through the document assigner, may associate 436 each document associated with the first child node to at least one of the first grandchild node, the second grandchild node, and the null set. The process of FIG. 4 or a portion thereof may be repeated as necessary until a designated cut condition is reached.

Each training document set associated with a node may remain associated with that node in the resulting taxonomy tree data structure if the training documents are a subset of the documents to be categorized by the binary taxonomy tree. In one example, each document set may remain assigned to its respective node, regardless of its level in the tree, resulting in a parent node being associated with all the documents of each of its child nodes. In another example, only those document sets associated with a leaf node of the resulting tree data structure may be retained in the document association data store. Alternatively, if the set of training documents are not part of the set of documents to be categorized, the document associations may be ignored or removed. In this manner, the training documents may be used only to train the taxonomy tree.

New documents may be classified by associating each new document with a node of the binary tree to form a hierarchical taxonomy tree with documents associated with the nodes of the binary tree data structure 250, shown in FIG. 2. As shown in FIG. 2, a document sorter 240 may receive a new document 242, and associate that document with at least one node of the tree 230. The nodal association of each document may be stored in a data store. The document sorter 240 may be one and the same as the document assigner 360 of the tree generator shown in FIG. 3, and may base the association on an entropy or distance measure (e.g., K1 divergence). However, unlike the training process, the list of terms and their associated term probabilities at each node are not adjusted. As a result, assignment of a new document may 'walk' the nodes of the binary tree on a path determined by selecting the next level node based on the node with the least K1 divergence and/or the K1 divergence to a node being below a predetermined threshold value. Since the tree is 'walked' by each document to be assigned, the assignment process can accomplished with parallel computing.

Because new documents may contain terms that are not in the set of training documents, the bulk or document probability may be based upon a smoothing of the term probabilities of those terms not actually appearing in the document. As noted above, the term probabilities may be smoothed using any suitable method including simplified Jelinek-Mercer, Dirichlet prior, and absolute discounting. In this manner, the probability of a term appearing in a document is not zero since the whole corpus of documents provides a system knowledge which accounts for system error and the new document is treated statistically such that it is only one possible occurrence or combination of terms.

Figure 5:
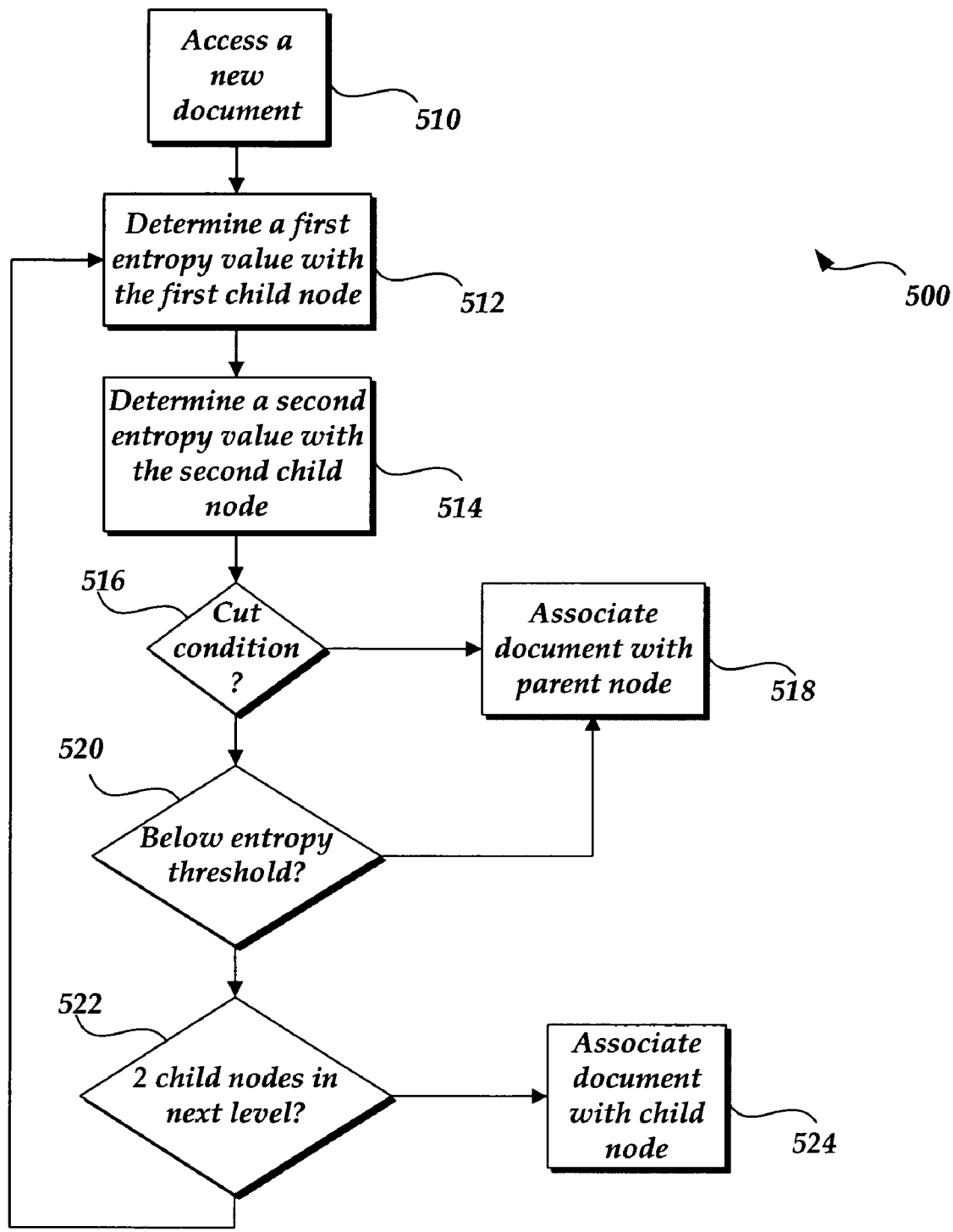
FIG. 5 is a flow chart of an example method of assigning a document to a binary tree in one embodiment.

FIG. 5 illustrates an example method 500 of operation of the document sorter 240 of FIG. 2. The document sorter may access 510 a new document to be associated with a binary tree taxonomy data structure. The document sorter may determine 512 a first distance value between the new document and the first child node and may determine 514 a second distance value between the new document and the second child node. As noted above the distance measure, such as a K1 divergence, may be based upon the probability of a list of terms appearing in the document, and each child node may have its own associated probability for each term.

The document sorter may determine 516 if a cut condition is met. As discussed above, the cut condition may be any suitable condition such as the K1 divergence between both child nodes is above a given threshold or the parent node is a leaf node in the binary tree. If the cut condition is met, then the document may be associated with the parent node of the two child nodes. If the cut condition is not met, the document sorter may determine 520 if one of the determined distance values is below a distance threshold value. The distance threshold may be predetermined and constant within the document sorter. In this manner, the document may follow both nodes if both distance values are below the distance threshold value. Alternatively, the distance threshold may be a dynamic value based upon the document being sorted. For example, the distance threshold may be the largest of the two computed distance values. If one of the distance values is below the distance threshold, the document sorter may determine 522 if two child nodes depend from the child node associated with that distance value (e.g., two grandchild nodes of the parent through that child node). For example, if the first distance value is below the threshold, the document sorter may determine if the first child node has two children nodes itself, e.g., if the tree extends from the first child node. If two grandchildren nodes exist, then the document sorter may determine a third distance value between the new document and the first grandchild node and may determine a fourth distance value between the new document and the second grandchild node, as discussed above with respect to determining 512, 514 the first and second distance values. The document sorter may continue walking the binary tree until the cut condition has been met and the document is associated with at least one node of the binary tree.

Rather than assigning a document based on the K1 divergence to a single node, the document sorter 240 may use a different process than the document assigner 360 to associate the new documents with a node of the binary taxonomy tree. In one example, the document sorter 240 may assign a document based on the minimum K1 divergence over the whole path of the document from the root node. More particularly, as discussed above, a document 'walks' the tree based on the computed K1 divergence between the document and the two sibling nodes of the next lower level. However, rather than associating the document with the node having the lesser K1 divergence value of two choices at a given node, the K1 divergence of the document may be accumulated or combined, in a total K1 divergence value of the entire path walked by the document through the tree. The document may then be assigned to the path or paths which have a combined K1 divergence below a predetermined threshold and/or has the least value. The combined K1 divergence value may be determined using any suitable method including compound decision theory such as a Viterbi algorithm. A Viterbi algorithm may find the most likely node sequence or path in the maximum a *posteriori* sense of the binary tree which may be assumed to be a finite-node, discrete time process. One representative example is described in Viterbi, "Error bounds for convolutional codes and an asymptotically optical decoding algorithm," IEEE Trans. Information Theory, IT-13, pp. 260-269, 1967, incorporated by reference herein.

The associations between a document and the nodes of the binary tree structure may be stored in a data store. The associations may be stored in any appropriate format and/or index including an association data store, a table, a vector, or as a part of the document's metadata. For example, each node in the tree may be addressable according to its path in the hierarchical taxonomy. This path may be created by traversing the branches connecting subject node 154 with ancestor nodes (e.g., parent and grandparent nodes) and descendent nodes (e.g., children and grandchildren) shown in FIG. 1. This path, called a node path or category path may be stored in the form "grandparent/parent/subject node/child." It is to be appreciated that any suitable indication of a node's placement in the tree structure may be appropriate. For example, a binary string may indicate the path to the node with '0' indicating a traverse to a child to the left and a '1' indicating a traverse to a child to the right. In another example, the nodes may be numbered such as the grandparent node may be 1 and the parent nodes may be numbered 2 and 3 respectively, and the like. In one example, the document sorter 240 may store a string indicating the path of the associated node in a data store, such as a database, an index, or a portion of the document metadata.

As shown in FIG. 2, the binary taxonomy tree 250 with associated documents may be sent to an information retrieval system 260 to be used to retrieve, cluster, sort, and/or filter documents as desired. For example, the documents associated with particular nodes may be retrieved based upon the node assignment, e.g., documents in a node may be retrieved by locating a node matching specified query terms. In some cases, a typical inverted index may be used by a query engine to return selected documents in response to a query by a user. To address the problem of dispersion of documents in search results, a query engine may sort or cluster the selected documents based upon the associated nodes. Additionally or alternatively, a hierarchical tree may be formed specific to the documents selected by the query engine. In this manner, at least a portion of the retrieved documents may be used to generate or train a binary tree specific to those documents and the documents may then be sorted or clustered according to their respective nodes to present a hierarchical search result to the computer user. The hierarchical taxonomy tree may also be used to filter documents to return only those documents to the user in accordance with user preferences. Moreover, the taxonomy tree may return an indication of additional documents that may be similar to or associated with a selected document. For example, the query engine may retrieve a document based upon the query terms, and the retrieved document may be associated with a particular node of the binary taxonomy tree. The query engine may return not only the retrieved document, but also a list of documents that are associated with the same node and/or adjacent nodes to expand the search beyond the query terms presented by the user. Additionally or alternatively, labels associated with the adjacent nodes may be returned to the user with the retrieved document to indicate further searching locations for desired documents. The categorized documents may also be searched based upon nodal association to restrict a search to only a portion of the available documents. It should be appreciated that any suitable information retrieval method and use may be appropriately based upon the binary tree discussed above.

Figure 6:
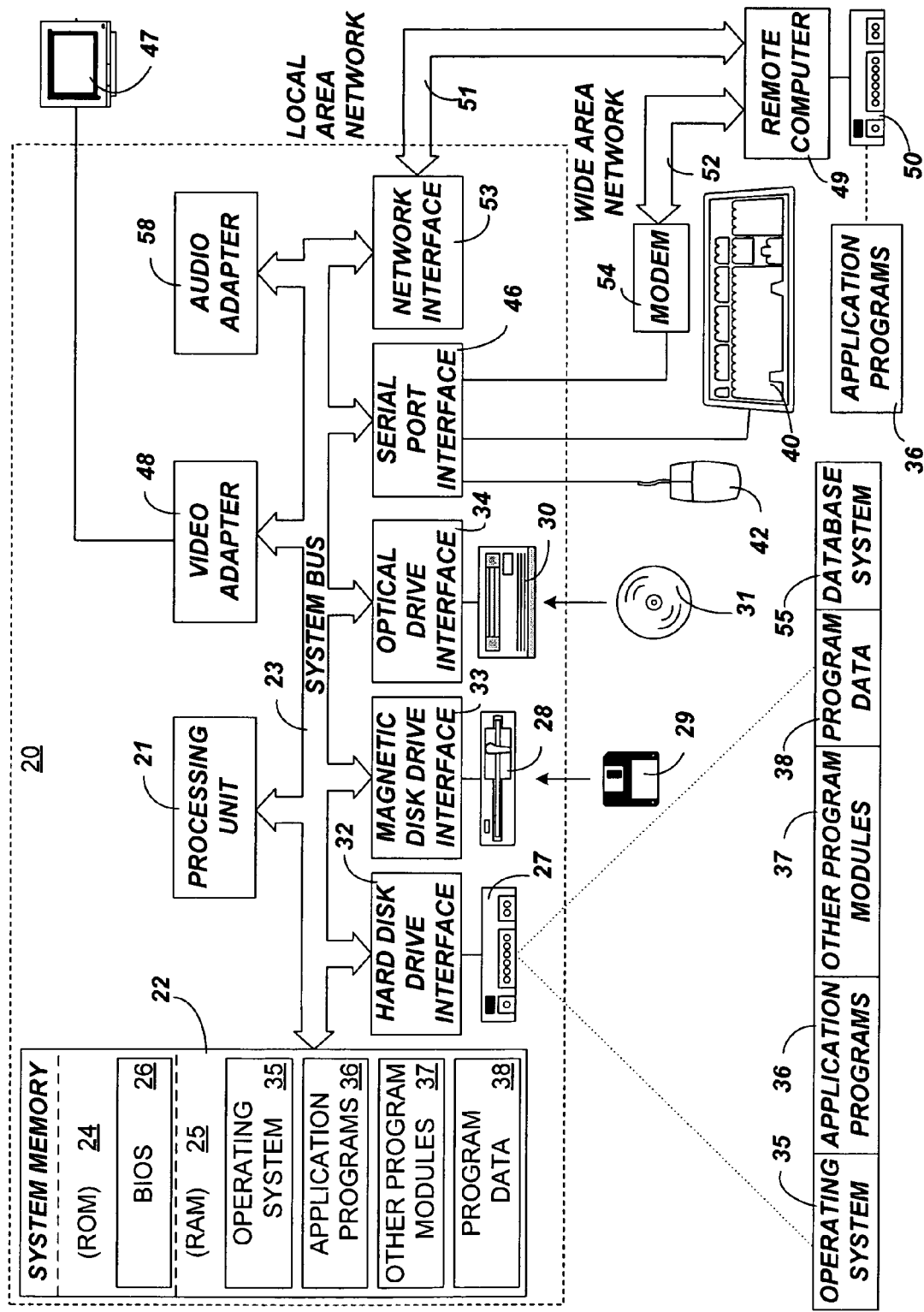
FIG. 6 is a block diagram of an example system useful for implementing an embodiment of the present invention.

FIG. 6 illustrates an example of a suitable computing system environment 900 on which any combination of the tree generator 220 and document sorter 240 may be implemented. The computing system environment 900 is only one example of a suitable computing environment and is not intended to suggest any limitation as to the scope of use or functionality of the invention. Neither should the computing environment 900 be interpreted as having any dependency or requirement relating to any one or combination of components illustrated in the exemplary operating environment 900.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 910. Components of computer 910 may include, but are not limited to, a processing unit 920, a system memory 930, and a system bus 921 that couples various system components including the system memory to the processing unit 920. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 910 typically includes a variety of computer readable media. Computer readable media can be any available media that can be accessed by computer 910 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 910. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 930 includes computer storage media in the form of volatile and/or nonvolatile memory such as read only memory (ROM) 931 and random access memory (RAM) 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 6 illustrates operating system 934, application programs 935, other program modules 936, and program data 937.

The computer 910 may also include other removable/non-removable, volatile/nonvolatile computer storage media. By way of example only, FIG. 6 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 6, provide storage of computer readable instructions, data structures, program modules and other data for the computer 910. In FIG. 6, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor, computers may also include other peripheral output devices such as speakers 997 and printer 996, which may be connected through a output peripheral interface 990.

The computer 910 may operate in a networked environment using logical connections to one or more remote computers, such as a remote computer 980. The remote computer 980 may be a personal computer, a server, a router, a network PC, a peer device or other common network node, and typically includes many or all of the elements described above relative to the computer 910, although only a memory storage device 981 has been illustrated in FIG. 6. The logical connections depicted in FIG. 6 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other means for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 6 illustrates remote application programs 985 as residing on memory device 981. It will be appreciated that the network connections shown are exemplary and other means of establishing a communications link between the computers may be used.

While the preferred embodiment of the invention has been illustrated and described, it will be appreciated that various changes can be made therein without departing from the spirit and scope of the invention.

The embodiment of the invention in which an exclusive property or privilege is claimed are defined as follows:

1. A computer readable medium having computer-executable components comprising:
   (a) a node generator constructed to receive a list of training terms based on a set of training documents, and to generate a first sibling node comprising a first set of probabilities, and to generate a second sibling node comprising a second set of probabilities, the first set of probabilities comprising, for each term in the list of training terms, a probability of the term appearing in a document, and the second set of probabilities comprising, for each term in the list of training terms, a probability of the term appearing in a document, wherein the first sibling node and the second sibling node are generated by dividing from a parent node;
   (b) a document assigner constructed to associate, based on the first and second set of probabilities, each document of the set of training documents to at least one of a group consisting of the first sibling node, the second sibling node, and a null set, the documents associated with the first sibling node forming a first document set and the documents associated with the second sibling node forming a second document set; and
   (c) a tree manager constructed to communicate at least one of the first document set and the second document set to the node generator to create a binary tree data structure comprising a hierarchy of a plurality of sibling nodes based on recursive performance of the node generator and the document assigner, and
   (d) a document sorter constructed to associate a new document to at least one node of the plurality of sibling nodes based on respective sets of probabilities associated with the nodes, and
   wherein the tree manager stores the binary tree data structure for access by the document sorter.

2. The computer readable medium of claim 1, wherein the document sorter compares a statistical distance between the new document and each of the first and second sibling nodes.

3. The computer readable medium of claim 1, further comprising a term generator constructed to receive the set of training documents and to generate the list of training terms based on terms appearing in at least a portion of the document in the set of training documents.

4. The computer readable medium of claim 3, wherein the term generator generates the list of training terms based on the frequency of occurrence of the terms appearing in at least a portion of the documents.

5. The computer readable medium of claim 3, wherein the term generator considers a predetermined list of exclusionary terms.

6. The computer readable medium of claim 1, wherein the node generator determines the first and second sets of probabilities based on maximizing a likelihood of all training documents being associated with the first and second node based on the first and second sets of probabilities.

7. The computer readable medium of claim 6, wherein the node generator maximizes the likelihood based on an expectation maximization algorithm.

8. The computer readable medium of claim 1, wherein the document assigner determines a statistical distance value between each document of the set of training documents and each of the first node and the second node.

9. The computer readable medium of claim 8, wherein the document assigner associates a document of the set of training documents to the first node if the determined distance value between the document and the first node is less than a predetermined threshold.

10. The computer readable medium of claim 8, wherein the distance value is a KL divergence value.

11. A computer implemented method comprising the steps of:
    (a) creating a binary taxonomy tree based upon a set of training documents, such that each node of the binary taxonomy tree is associated with a list of terms, and each term in each list of terms is associated with a probability of that term appearing in a document given that node, wherein a root node is first created and is then used to create child nodes of the binary taxonomy tree, wherein the child nodes are created by division from their respective parent nodes, and wherein the binary taxonomy tree is stored for associating new documents with nodes of the binary taxonomy tree; and
    (b) associating a new document with at least one node of the binary tree based upon a distance value between that document and the node.

12. The method of claim 11, wherein creating the binary taxonomy tree comprises determining each probability of the term appearing in a document based on an expectation maximization algorithm maximizing a likelihood of each document in the set of training documents being generated by the list of terms associated with each of two sibling nodes of the binary taxonomy tree.

13. The method of claim 11, wherein the distance value is determined based upon a K1 divergence.

14. The method of claim 13, wherein the new document is associated with a node having the K1 divergence below a distance threshold.

15. The method of claim 13, wherein associating the new document comprises associating the new document to a node with a path having the least K1 divergence over the path.

16. The method of claim 11, wherein creating the binary taxonomy tree comprises determining each list of terms associated with a node based on the list of terms associated with a parent node of the node associated with the list of terms.

17. The method of claim 11, wherein creating the binary taxonomy tree comprises associating at least a portion of the set of training documents to at least one of a first child node, a second child node, and a null set.

18. The method of claim 17, wherein associating at least a portion of the training documents is based on each probability of each term associated with the first child node and each probability of each term associated with the second child node.

19. A computer readable medium having computer-executable instructions for performing steps comprising:
    (a) accessing a document;
    (b) based upon a first probability of a set of training terms appearing in the document, determining a first distance value between the document and a first of two sibling nodes;
    (c) based upon a second probability of the set of training terms appearing in the document, determining a second distance value between the document and a second of two sibling nodes, wherein the two sibling nodes are created by division from a parent node;
    (d) if the first distance value is below a distance threshold, determining if two children nodes are associated with the first of two sibling nodes;
    (e) if two children nodes are associated with the first of two sibling nodes, then determining a third distance value between the document and the first of the two children nodes, and determining a fourth distance value between the document and the second of the two children nodes; and (f) if two children nodes are associated with the first of two sibling nodes, associating the document with at least one of the first and the second children nodes based upon the third distance value and the fourth distance value, wherein a tree representation of the parent node, the two sibling nodes, and the two children nodes are stored in memory for use in classifying; and (g) classifying a new document into one of the two sibling nodes or one of the two children nodes based on the terms in the new document and the set of probabilities associated with each node in the tree representation.

20. The computer readable medium of claim 19, wherein determining the first distance value comprises determining a first K1 divergence between the document and the first of two sibling nodes, and wherein determining the second distance value comprises determining a second K1 divergence between the document and the second of two sibling nodes.

21. The computer readable medium of claim 19, wherein the distance threshold is the second distance value.

22. The computer readable medium of claim 19, wherein the distance threshold is a predetermined entropy value.

23. The computer readable medium of claim 19, further comprising determining if the second distance value is below the distance threshold and determining if two other children nodes are associated with the second of two sibling nodes.

24. The computer readable medium of claim 23, if two other children nodes are associated with the second of two sibling nodes, further comprising determining a fifth distance value between the document and the first of the two other children nodes, and determining a sixth distance value between the document and the second of the two other children nodes.

25. The computer readable medium of claim 23, if two other children nodes are not associated with the second of two sibling nodes, further comprising associating the document with the second of two sibling nodes.

26. The computer readable medium of claim 19, if two children nodes are not associated with the first of two sibling nodes, further comprising associating the document with the first of two sibling nodes.

27. The computer readable medium of claim 19, wherein if neither the first and the second distance values is below the distance threshold, further comprising associating the document with a parent node of the first and second of two sibling nodes.

28. A computer implemented method comprising:
(a) receiving a training set of documents, each document comprising a list of terms;
(b) selecting a first set of training terms from at least a portion of the terms listed in the lists of terms;
(c) for each of the training terms, generating a first probability of the training term appearing in any document and associating that probability with a first node;
(d) for each of the training terms, generating a second probability of the training term appearing in any document and associating that probability with a second node;
(e) based on the first and second probabilities for each training term, associating each list of terms to at least one of the group consisting of the first node, the second node, and a null set;
(f) forming a second set of training terms from at least a portion of the terms listed in the lists of terms associated with the first node;
(g) for each of the training terms in the second set of training terms, generating a third probability of the training term appearing in any document and associating that probability with a third node, wherein the third node is generated by dividing the first node;
(h) for each of the training terms in the second set of training terms, generating a fourth probability of the training term appearing in any document and associating that probability with a fourth node, wherein the fourth node is generated by dividing the second node;
(i) based on the third and fourth probabilities for each training term, associating each list of terms to at least one of the group consisting of the third node, the fourth node, and the null set,
storing in a memory, a tree representation of the first node, the second node, the third node, and the fourth node, and
(j) classifying a new document into one of the first node, second node, third node, or fourth node based on the terms in the new document and the set of probabilities associated with each node in the tree representation.

29. The method of claim 28, wherein generating the probability of the term comprises maximizing the probability that each list of terms is in at least one of a first node and a second node of a layer of the binary tree.

30. The method of claim 28, wherein assigning the new document comprises generating a new list of terms appearing in the new document and walking the tree based on the probabilities of each term associated with each node of the tree.

* * * * *